United States Patent Office 3,102,145
Patented Aug. 27, 1963

3,102,145
INTERMEDIATE IN THE PREPARATION OF 19-NOR-PROGESTERONE
Gérard Nominé, Noisy-le-Sec, Robert Bucourt, Clichy-sous-Bois, and Jean Tessier, Paris, France, assignors to Roussel-UCLAF, S.A., Paris, France, a corporation of France
No Drawing. Filed June 21, 1962, Ser. No. 204,036
Claims priority, application France June 28, 1961
1 Claim. (Cl. 260—586)

The present invention relates to a novel process for the preparation of a 19-nor-steroid, particularly 19-nor-progesterone and to a novel intermediate.

19-nor-progesterone has been found to be four to eight times as active as progesterone. It has previously suffered the drawback, however, in that it was produced from costly natural sources, primarily from estradiol by a complicated synthesis.

An object of the present invention is a new process of preparation of 19-nor-progesterone by a total synthesis which does not require the use of costly natural products as starting compounds.

Another object of the invention is the development of a process for the production of 19-nor-progesterone which comprises the steps of (a) stereospecifically reducing the 9(10) double bond of 4,5-seco-19-nor-$\Delta^9$-pregnen-3,5,20-trione, obtained by a total synthesis, in the presence of a catalyst, (b) cyclizing the 4,5-seco-19-nor-pregnan-3,5,20-trione by the action of a cyclization agent, and (c) recovering said 19-nor-progesterone.

A still further object of the invention is the obtention of 4,5-seco-19-nor-pregnan-3,5,20-trione as an intermediate.

These and other objects of the invention will become apparent as the description thereof proceeds.

We have discovered a novel process of preparing 19-nor-progesterone starting from 4,5 - seco-19-nor-$\Delta^9$-pregnen-3,5,20-trione, a synthetically produced material, thus avoiding the use of costly natural products as starting compounds.

The process, as outlined in the objects, is shown by the flow diagram of Table I.

TABLE I

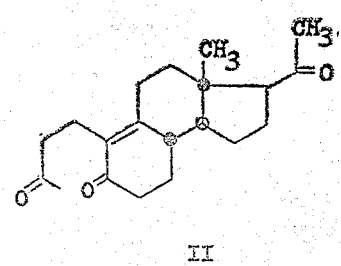

II

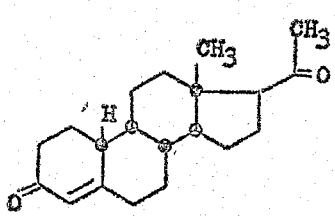

I

The 4,5-seco-19-nor-$\Delta^9$-pregnen-3,5,20-trione used as the starting compound is prepared according to the process described in our copending United States patent application Serial No. 191,265, filed April 30, 1962. An example of the preparation of this compound starting from 5-methoxy-$\Delta^{5,7,9}$-des-A-estratrien - 17$\beta$ - ol, described by Velluz et al., C.R. Acad. Sci., 250, 1084 (1960) will be described subsequently.

As previously indicated, the new process, object of the invention, is a process for the preparation of 19-nor-progesterone which comprises the steps of (a) stereo-specifically reducing the 9(10) double bond of 4,5-seco-19-nor-$\Delta^9$-pregnen-3,5,20-trione in the presence of a catalyst, (b) cyclizing the 4,5-seco-19-nor-pregnan-3,5,20-trione by the action of a cyclization agent, and (c) recovering said 19-nor-progesterone.

The stereospecific hydrogenation of 4,5-seco-19-nor-$\Delta^9$-pregnen-3,5,20-trione, II, Sept A, is realized by the action of hydrogen, preferably in the presence of a precious metal hydrogenation catalyst, such as palladium, platinum, etc., deposited on an inert carrier, such as carbon black, and while operating in an alkaline media. The alkalinity of the reaction media is preferably controlled by utilization of an inert organic solvent, such as lower alkanol, for example, ethanol, containing a tertiary amine, such as a tri-lower alkylamine, for example, triethylamine.

The cyclizing of 4,5-seco-19-nor-pregnan-3,5,20-trione, III, Step B, is effected by the action of a cyclization agent at about room temperature. As the cyclization agent, preferably one could use an acid agent, such as a mineral acid in an organic carboxylic acid media, for example, hydrochloric acid in an acetic acid media or an alkaline agent, such as an alkali metal tertiary-lower alkanolate, for example, sodium t.-amylate in an inert organic solvent.

The following is an example of the preparation of 4,5-seco-19-nor-$\Delta^9$-pregnen-3,5,20-trione, II, utilized as the starting compound in the process of the invention.

EXAMPLE I

Preparation of 4,5 - Seco - 19 - Nor-$\Delta^9$-Pregnen-3,5,20-Trione, II

STEP A: OXIDATION 3 gm. of 5-methoxy-$\Delta^{5,7,9}$-des-A-estratrien-17$\beta$-ol melting at 69° C. and having a specific rotation $[\alpha]_D^{20} = +15° \pm 3°$ (c.=1% in methanol), obtained according to Velluz et al., C.R. Acad. Sci., 250, 1084 (1960) were dissolved in 400 cc. of methylene chloride, 100 mg. of anhydrous potassium carbonate and 30 gm. of manganese bioxide were added thereto, and the reaction mixture was agitated for a period of 56 hours at room temperature. The solution was filtered. The filtrate was evaporated to dryness under vacuum and the residue was recrystallized from ethanol. 5-methoxy-$\Delta^{5,7,9}$-des-A-estratrien-17-one was obtained having a melting point of 89° C. and a specific rotation $[\alpha]_D^{20} = +99°$ (c.=1% in methanol).

The product occurred in the form of white starlike crystals, very soluble in methylethylketone and ethyl acetate, soluble in alcohol and hot isopropyl ether.

*Analysis.*—$C_{15}H_{18}O_2$; molecular weight=230.30. Calculated: C, 78.23%; H, 7.88%. Found: C, 78.2%; H, 7.8%.

U.V. spectra (in ethanol):

$$\lambda_{max.} = 279 \text{ m}\mu; \quad E_{1\text{ cm.}}^{1\%} = 91.8$$
$$\lambda_{max.} = 287.5 \text{ m}\mu; \quad E_{1\text{ cm.}}^{1\%} = 79.0$$

STEP B: ETHYNYLATION 30 cc. of 0.99 N solution of sodium t.-amylate in toluene were introduced into 270 cc. of anhydrous benzene. The mixture was heated under an atmosphere of nitrogen to 60° C. Then acetylene was allowed to bubble therethrough for a period of 30 minutes. The temperature was brought back to room temperature. 40 cc. of a benzenic solution containing 2.173 gm. of dextrorotatory in methanol 5-methoxy-$\Delta^{5,7,9}$-des-A-estratrien-17-one were added while agitating. The reaction mixture was allowed to stand at room temperature for a period of 2 hours. Next it was poured into water and neutralized by the addition of acetic acid. The aqueous phase was decanted, extracted with ether. Then the organic phases were combined, dried and evaporated to dryness under vacuum. The residue was recrystallized from cyclohexane and furnishes 5-methoxy-17$\alpha$-ethynyl-$\Delta^{5,7,9}$-des-A-estratrien-17$\beta$-ol having a melting point of 98.5° C. and a specific rotation $[\alpha]_D^{20} = -70.6$ (c.=1% in methanol).

The product occurred in the form of white needles, very soluble in alcohol, ether, acetone, benzene and chloroform, insoluble in water.

*Analysis.*—$C_{17}H_{20}O_2$; molecular weight=256.33. Calculated: C, 79.66%; H, 7.86%; O, 12.48%. Found: C, 79.8%; H, 7.8%; O, 12.4%.

The I.R. spectra presents in particular bands at 3 603 cm.$^{-1}$ and at 3 310 cm.$^{-1}$.

STEP C: ESTERIFICATION 2.08 gm. of 5-methoxy-17$\alpha$-ethynyl-$\Delta^{5,7,9}$-des-A-estratrien-17$\beta$-ol were dissolved in 20 cc. of acetic anhydride. 1 gm. of p-toluene sulfonic acid was added. The mixture was agitated until solution occurred and then allowed to stand for a period of 24 hours at room temperature. Thereafter, the mixture was poured in water, agitated for a half hour and extracted with methylene chloride.

The methylene chloride extracts were combined, dried and evaporated to dryness under vacuum. The residue was decolorized by magnesium silicate in methylene chloride. By crystallization from isopropyl ether, 5-methoxy-17$\beta$-acetoxy-17$\alpha$-ethynyl-$\Delta^{5,7,9}$-des-A-estratriene was obtained having a melting point of 93.5° C. and a specific rotation $[\alpha]_D^{20} = -54°$ (c.=1.5% in methonol).

The product occurred in the form of white crystals, soluble in alcohol, insoluble in water.

*Analysis.*—$C_{19}H_{22}O_3$; molecular weight=298.37. Calculated: C, 76.48%; H, 7.43%. Found: C, 76.5%; H, 7.4%.

STEP D: HYDRATION (a) *Preparation of the catalyst.*—200 gm. of Dowex 50 resin, a commercial cation exchanger, in acid form were introduced into 1 liter of an aqueous solution of N sulfuric acid. The mixture was agitated for a period of 30 minutes and decanted. The resin was washed with water. Then 3 gm. of mercuric acetate and 1 liter of water were added and agitated for a period of 10 minutes. The resin was decanted and washed again with water.

(b) *Hydration.*—5 gm. of 5-methoxy-17$\beta$-acetoxy-17$\alpha$-ethynyl-$\Delta^{5,7,9}$-des-A-estratriene and 62.5 gm. of the catalyst obtained as described above were introduced into 125 cc. of ethanol and heated to reflux while agitating for a period of 7 hours. The mixture was filtered. 600 cc. of methylene chloride were added to the filtrate. Ethanol was separated by entraining it in successive washings with distilled water. The solution was treated with animal black, filtered and then evaporated to dryness under vacuum. The residue crystallized from ethanol and furnished 5 - methoxy - 17$\beta$-acetoxy-17$\alpha$-acetyl-$\Delta^{5,7,9}$-des-A-estratriene having a melting point of 130° C. and a specific rotation $[\alpha]_D^{20} = +40°$ (c.=1% in methanol).

The product occurred in the form of white crystals, very soluble in acetone, benzene and chloroform, solubule in isopropyl ether and in hot alcohol, insoluble in water.

*Analysis.*—$C_{19}H_{24}O_4$; molecular weight=316.38. Calculated: C, 72.12%; H, 7.65%. Found: C, 72.2%; H, 7.4%.

STEP E: REDUCTION 0.786 gm. of lithium in small bits was introduced while cooling to 360 cc. of liquid ammonia. 72 cc. of anhydrous ether and 1.141 gm. of 5-methoxy-17$\beta$-acetoxy-17$\alpha$-acetyl-$\Delta^{5,7,9}$-des-A-estratriene in solution in 150 cc. of anhydrous ether were added. The reaction mixture was maintained while agitating under an atmosphere of nitrogen and at a temperature of $-45°$ C. for a period of an hour and a half. Next slowly 70 cc. of anhydrous methanol were added. Then at $-45°$ C. in a space of one hour, 3.6 gm. of lithium were added. The ammonia was evaporated. The residue was taken up by a mixture of 300 cc. of water and 200 cc. of ether. The ethereal phase was decanted, washed with water, dried and evaporated to dryness under vacuum. The residue was dissolved in 50 cc. of methanol, 12.5 cc. of hydrochloric acid and 25 cc. of water and heated to reflux for a period of one hour. The mixture was poured into water, extracted with methylene chloride. The methylene chloride extract was evaporated to dryness and the residue was subject to chromatography over silica gel. Elution with methylene chloride containing 10% of acetone furnished amorphous $\Delta^9$-19-nor-des-A-pregnen-20-ol-5-one having a specific rotation $[\alpha]_D^{20} = -23.3°$ (c.=1.3% in methanol).

The product is very soluble in acetone, benzene and chloroform, slightly soluble in ether.

U.V. spectra (in methanol):

$$\lambda_{max.} = 240 \text{ m}\mu; \quad E_{1\text{ cm.}}^{1\%} = 557$$

STEP F: OXIDATION 100 mg. of $\Delta^9$-19-nor-des-A-pregnen-20-ol-5-one were dissolved in 10 cc. of acetic acid. 0.25 cc. of a solution of 600 mg. of chromium trioxide in 5 cc. of acetic acid containing 10% water were added. The reaction mixture was agitated at room temperature for a period of one hour. Then 0.5 cc. of methanol were added and the mixture was allowed to stand for a period of 45 minutes. The mixture was poured into water, neutralized by the addition of sodium bicarbonate and extracted with methylene chloride. The extracts supplied upon evaporation under vacuum a residue constituting the $\Delta^9$-19-nor-des-A-pregnen-5,20-dione, which was purified by subjecting to chromatography over silica gel. A white product was obtained having a melting point of 80° C. and a specific rotation $[\alpha]_D^{20} = +53°$ (c.=0.75% in methanol), which was very soluble in the usual organic solvents, insoluble in water.

*Analysis.*—$C_{16}H_{22}O_2$; molecular weight=246.34. Calculated: C, 78.00%; H, 9.00%. Found: C, 77.7%; H, 8.8%.

U.V. Spectra (in ethanol):

$$\lambda_{max.} = 239 \text{ m}\mu; \quad \epsilon = 16,200$$

STEP G: FORMATION OF THE ENAMINE 2 gm. of $\Delta^9$-19-nor-des-A-pregnen-5,20-dione were introduced into 0.74 cc. of pyrrolidine. By slow heating, dissolution was obtained. The solution was cooled and 5 cc. of anhydrous methanol were added thereto. The reaction mixture was then allowed to stand at a temperature of −5° C. to −10° C. for a period of one hour. The product formed was vacuum filtered, washed with methanol and dried and the 5-pyrrolidyl-$\Delta^{5(10),9(11)}$-19-nor-des-A-pregnadien-20-one was obtained having a melting point of 142° C. and a specific rotation $$[\alpha]_D^{20} = +251° \ (c.=0.5\% \text{ in pyridine})$$

The product occurred in the form of yellow needles, soluble in benzene, slightly soluble in alcohol.

*Analysis.*—$C_{20}H_{29}ON$; molecular weight=299.44. Calculated: N, 4.68%. Found: N, 4.7%.

STEP H: 3-CHLORO-4,5-SECO-19-NOR-$\Delta^{2,9}$-PREGNADIEN-5,20-DIONE 5.16 gm. of 5-pyrrolidyl-19-nor-$\Delta^{5(10),9(11)}$-des-A-pregnadien-20-one having a melting point of 142° C. and a specific rotation $[\alpha]_D^{20}=+251°$ (c.=0.5% in pyridine) were introduced into 40 cc. of dimethylformamide under an atmosphere of nitrogen. Then 2.88 gm. of potassium iodide and 3.08 gm. of 1,3-dichloro-2-butene were added. The reaction mixture was agitated at 0° C. for a period of an hour and a half, then allowed to stand at 0° C. overnight. The reaction mixture was poured into water and extracted with ether. The ethereal extracts were combined, washed with an aqueous solution containing 1% of sodium bisulfite, then with water. After drying and filtration, the ethereal extracts were evaporated to dryness under vacuum and 5.850 gm. of a product were obtained which was subject to chromatography over magnesium silicate. Elution with methylene chloride furnished 5 gm. of 3-chloro-4,5-seco-19-nor-$\Delta^{2,9}$-pregnadien-5,20-dione.

The product occurred in the form of a pale yellow oil which was used as such for the next step of the synthesis.

STEP I: 4,5-SECO-19-NOR-$\Delta^9$-PREGNEN-3,5,20-TRIONE 5 gm. of 3-chloro-4,5-seco-19-nor-$\Delta^{2,9}$-pregnadien-5,20-dione were dissolved in 5 cc. of acetic acid. This solution was introduced drop by drop into 25 cc. of sulfuric acid cooled to −15° C. and after the addition the solution was agitated at room temperature for a period of a half hour, then poured into water. Sodium bicarbonate was added until the solution was neutralized. Then the aqueous solution was extracted with methylene chloride. The extracts were combined, washed with water, dried, filtered and evaporated to dryness under vacuum. The residue was subjected to chromatography over silica gel and elution with methylene chloride containing 4% of acetone, 4.2 gm. of 4,5-seco-19-nor-$\Delta^9$-pregnen-3,5,20-trione,II, were obtained.

The product occurred in the form of an oil having a specific rotation $[\alpha]_D^{20}=+37°$ (c.=1% in methanol).

The following example is illustrative of the invention. It is not, however, to be construed as limitative in any manner. It is obvious that other expedients known to those skilled in the art may be employed.

EXAMPLE II

*Preparation of 19-Nor-Progesterone, I*

STEP A: REDUCTION 31.6 mg. of palladized carbon black containing 10% of palladium hydroxide were introduced into 25.3 cc. of 95% ethanol and 2.5 cc. of a 10% ethanolic solution of triethylamine. The catalyst was hydrogenated by passing hydrogen therethrough, then 316 mg. of 4,5-seco-19-nor-$\Delta^9$-pregnen-3,5,20-trione, II, prepared as previously indicated, were introduced in solution in 25.3 cc. of ethanol. Hydrogenation was continued. After an absorption of the theoretical amount of hydrogen, the solution was filtered, then evaporated to dryness under vacuum.

The residue consisted of 4,5-seco-19-nor-pregnan-3,5,20-trione, III, which was utilized as such for the next step of the synthesis.

This compound is not described in the literature.

STEP B: CYCLIZATION 323 mg. of 4,5-seco-19-nor-pregnan-3,5,20-trione, III, obtained according to the preceding step, were dissolved in 6.4 cc. of acetic acid. 0.4 cc. of concentrated hydrochloric acid were added thereto and the solution was allowed to stand overnight at room temperature. The reaction mixture was next poured into water, neutralized by the addition of sodium bicarbonate, then extracted with ether. The ethereal extracts were combined, washed with water and dried. Thereafter, they were filtered, then evaporated to dryness under vacuum. The residue was crystallized from isopropyl ether. 166 mg. (being an overall yield of 58%) of 19-nor-progesterone, I, were obtained, having a melting point of 144° C. and a specific rotation $[\alpha]_D^{20}=+139°$ (c.=0.5% in chloroform), identical to the product as described in the literature.

The preceding example is not to be construed as limiting the invention. It is evident to one skilled in the art that temperatures, the nature of the solvents, the hydrogenation catalyst or the cyclization agent may be varied or that equivalent techniques may be used without departing from the spirit of the invention or the scope of the appended claim.

We claim:

4,5-seco-19-nor-pregnan-3,5,20-trione.

References Cited in the file of this patent

Velluz et al.: Comptes Rendus de l'acad. des Sciences, vol. 250, pp. 1084 and 1085 (1960).